US009765661B2

(12) United States Patent
Maunula et al.

(10) Patent No.: US 9,765,661 B2
(45) Date of Patent: *Sep. 19, 2017

(54) COATING FOR PARTICULATE FILTERS

(75) Inventors: Teuvo Maunula, Oulu (FI); Marja Kärkkäinen, Oulu (FI); Pasi Juvonen, Oulu (FI); Pekka Matilainen, Jyväskylä (FI)

(73) Assignee: DINEX ECOCAT OY, Vihtavuori (FI)

( * ) Notice: Subject to any disclaimer, the term of this patent is extended or adjusted under 35 U.S.C. 154(b) by 139 days.

This patent is subject to a terminal disclaimer.

(21) Appl. No.: 12/304,141

(22) PCT Filed: Jun. 15, 2006

(86) PCT No.: PCT/FI2006/000202
§ 371 (c)(1),
(2), (4) Date: Feb. 20, 2009

(87) PCT Pub. No.: WO2007/144446
PCT Pub. Date: Dec. 21, 2007

(65) Prior Publication Data
US 2009/0199539 A1    Aug. 13, 2009

(51) Int. Cl.
*B01D 53/00*    (2006.01)
*F01N 3/021*    (2006.01)
*B01D 53/94*    (2006.01)
*B01J 23/40*    (2006.01)
*B01J 23/42*    (2006.01)
(Continued)

(52) U.S. Cl.
CPC ........... *F01N 3/021* (2013.01); *B01D 53/944* (2013.01); *B01J 23/40* (2013.01); *B01J 23/42* (2013.01); *B01J 35/002* (2013.01); *B01J 37/0242* (2013.01); *F01N 3/035* (2013.01);
(Continued)

(58) Field of Classification Search
CPC .. C09D 1/00; F01N 3/021; F01N 3/035; B01J 23/40; B01J 23/42; B01J 35/002; B01J 35/0013; B01J 37/0242; B01J 21/063; B01J 21/066; B01D 53/944; Y10T 29/49345
USPC ............. 55/523, 524, DIG. 24; 60/274, 311; 106/287, 287.18, 287.1–287.17; 422/177; 252/88.2, 186.25; 502/100–355,
(Continued)

(56) References Cited

U.S. PATENT DOCUMENTS 4,590,173 A * 5/1986 Sasaki et al. .................. 502/204
5,212,131 A * 5/1993 Belding ................. B01D 53/02
502/401

(Continued)

FOREIGN PATENT DOCUMENTS

WO          03002853 A2    1/2003
WO       2004047952 A2    6/2004
WO     WO 2005120687     12/2005

OTHER PUBLICATIONS

International Search Report dated Mar. 9, 2007, in PCT application.
(Continued)

*Primary Examiner* — T. Bennett McKenzie
(74) *Attorney, Agent, or Firm* — Berggren Inc.

(57) ABSTRACT

The invention relates to the coating of a particulate filter used in the treatment of exhaust or waste gases. In the manufacturing of the coating according to the invention, there is used a liquid-based sol, where the average particle size of the contained particles is below 100 nm, preferably below 50 nm.

12 Claims, 5 Drawing Sheets

Figure 1:
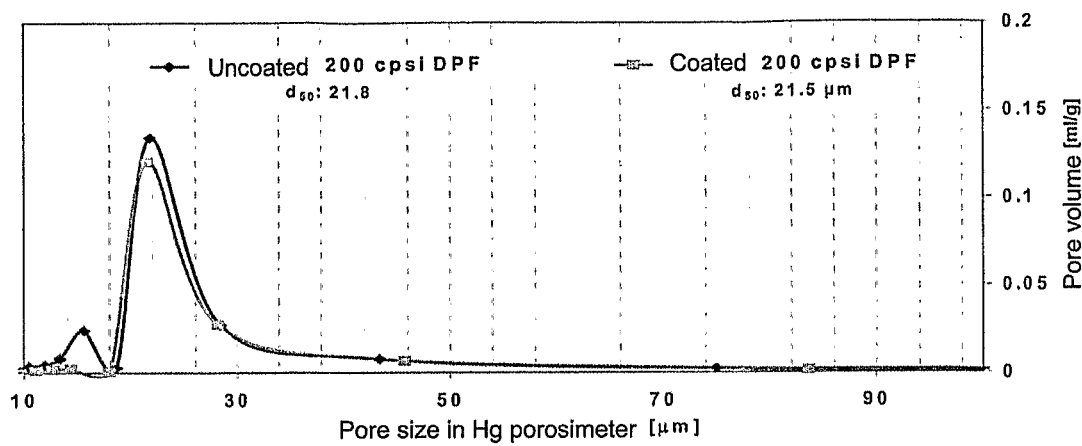

(51) Int. Cl.
  *B01J 37/02* (2006.01)
  *F01N 3/035* (2006.01)
  *B01J 21/06* (2006.01)
  *B01J 35/00* (2006.01)

(52) U.S. Cl.
  CPC ............ *B01J 21/063* (2013.01); *B01J 21/066* (2013.01); *B01J 35/0013* (2013.01); *Y10T 29/49345* (2015.01)

(58) Field of Classification Search
  USPC ...... 502/506–514, 414–415, 527.12–527.15; 427/190–206, 207.1–208.8
  See application file for complete search history.

(56) References Cited

U.S. PATENT DOCUMENTS

| | | | |
|---|---|---|---|
| 5,376,442 A * | 12/1994 | Davidson et al. | 428/307.7 |
| 5,422,331 A * | 6/1995 | Galligan et al. | 502/333 |
| 5,885,657 A * | 3/1999 | Penth | 427/372.2 |
| 5,945,369 A * | 8/1999 | Kimura et al. | 502/304 |
| 5,948,355 A * | 9/1999 | Fujishima et al. | B01D 53/8603 422/121 |
| 6,074,983 A * | 6/2000 | Derolf et al. | 502/407 |
| 6,171,572 B1 * | 1/2001 | Aozasa | 423/594.12 |
| 6,340,379 B1 * | 1/2002 | Penth et al. | 95/45 |
| 6,814,783 B2 * | 11/2004 | Fitch et al. | 95/143 |
| 6,818,254 B1 * | 11/2004 | Hoke et al. | B01D 53/02 427/421.1 |
| 6,841,075 B2 * | 1/2005 | Hoerpel et al. | 210/650 |
| 7,018,449 B2 * | 3/2006 | Fitch et al. | 95/143 |
| 7,115,160 B2 * | 10/2006 | Fitch et al. | 96/108 |
| 7,749,414 B2 * | 7/2010 | Bitterlich et al. | 264/45.1 |
| 2003/0039597 A1 * | 2/2003 | Deeba et al. | 422/177 |
| 2003/0129098 A1 * | 7/2003 | Endo et al. | 422/171 |
| 2004/0014909 A1 * | 1/2004 | McDaniel et al. | 526/64 |
| 2004/0087440 A1 * | 5/2004 | Kuno | 502/304 |
| 2004/0168308 A1 * | 9/2004 | Aluffo | 29/761 |
| 2004/0229752 A1 * | 11/2004 | Long et al. | B01D 53/0446 502/303 |
| 2005/0076505 A1 | 4/2005 | Marino, Jr. | |
| 2006/0018806 A1 | 1/2006 | Ziebarth et al. | |
| 2006/0075731 A1 * | 4/2006 | Ohno et al. | 55/523 |
| 2006/0120936 A1 | 6/2006 | Alive et al. | |
| 2006/0199730 A1 * | 9/2006 | Seely et al. | 502/246 |
| 2007/0081926 A1 * | 4/2007 | Okabe | 422/177 |
| 2007/0083998 A1 * | 4/2007 | Leskowicz | A61L 2/22 8/115.51 |
| 2008/0226540 A1 * | 9/2008 | Felthouse et al. | 423/522 |
| 2009/0113879 A1 * | 5/2009 | Ohno | 60/297 |
| 2011/0160050 A1 * | 6/2011 | Feaviour | 502/304 |

OTHER PUBLICATIONS

European Search Report, dated May 27, 2011, in Application No. EP 07 70 0257.
European Office Action dated Apr. 4, 2012, from corresponding EP application.

* cited by examiner

COATING FOR PARTICULATE FILTERS

BACKGROUND OF THE INVENTION

The invention relates to a particulate filter coating used in the treatment of exhaust or waste gases, as well as to the particulate filter itself. The invention also relates to a method for manufacturing and using said particulate filter.

During the years 2005-2012, the exhaust gas emission standards for diesel cars shall become so stringent that it becomes necessary to use particulate filters in order to follow the emission standards for particulate matter (PM). With diesel cars, the most difficult standards to follow are PM and $NO_x$ emission standards, but carbon monoxide and hydrocarbon emissions can be effectively eliminated by oxidation catalysts. As regards $NO_x$ emissions, the chosen strategy in the first stages has been one where it would not be necessary to use after-treatment techniques, because these tend to increase the general fuel consumption, or they require separate components in the car. For reducing $NO_x$, there can be used motor technical methods (combustion temperature, cylinder conditions, EGR) which, however, have an effect that increases PM and HC emissions. Therefore the use of diesel particulate filters (DPF) is necessary in these targets. The average, concentration-based particle size obtained from modern diesel motors is less than 100 nm. There has recently been a widespread discussion of the hazardous nature of PM emissions, because small particles are conducted to the lungs, and very small particles may end up in the human system. The particles contain heavy hydrocarbons, soot ($CH_x$) that is classified as carcinogenic, as well as various inorganic compounds.

DPF:s are typically made of cordierite, SiC or sintered metal, and the aim is to realize DPF structures where the increase of counterpressure and the PM storage capacity are optimized. Regular commercial DPF:s have a cellular structure, where the gas flow must penetrate a porous wall (wall-flow DPF). The cellular system contains open channels (hydraulic diameter roughly 1-2 mm), half of which are closed at the inlet end and half at the outlet end, with the purpose to force the flow through the porous wall. Generally the share of the pores in the walls is roughly 40-60%, and the average pore size is roughly 10-40 μm, in which case the counterpressure remains low, but with this structure, reasonably small particles can be filtered at an efficiency of over 90%. In some cases, particularly in retrofit targets, there also are used DPF:s operated by a so-called deep filtration principle, and with these filters, the filtering efficiency remains, owing to larger pore sizes, lower than with cellular-type DPF:s, because the particles are partly dispersed in the filter material. This kind of DPF:s are made, among others, of ceramic or metallic fibers, foams and other porous materials.

By using a DPF, it is possible to remove the hydrocarbon-bearing volatile fraction (VOF=volatile organic fraction or SOF=soluble organic fraction) of the PM:s by an efficient oxidation catalyst. The removal of the carbon fraction requires thermal or catalytic combustion, for which there are developed various different regeneration methods for maintaining the counterpressure of the filter reasonably low and for preventing it from blocking by PM. Generally the PM soot is burned thermally by additional heat. The combustion of soot is started, when the temperature reaches the level of over 550-600° C. in the exhaust gas containing excessive oxygen. The additional heat is generated for example by burners, additional fuel supply, electric resistors or by some other way by supplying additional energy in the DPF or in the exhaust gas before the DPF. Soot can be oxidized by an intensive combustion reaction with oxygen at a temperature higher than 550° C., or slowly at lower temperatures (250-350° C.) by $NO_2$. In both reactions, it is possible to use catalysts. Catalytic soot combustion by oxygen has been widely studied for several decades, and the typical catalysts are compounds forming so-called molten salts, containing, among others, vanadium, Cu, K, Cs and perovskite compounds (Fino 2003). In active regeneration, additional heat is fed in the DPF, but in passive filtering, the purpose is to oxidize the particles continuously by means of $NO_2$. A developed CRT method (Continuous Regenerating Trap) includes a Pt-bearing oxidation catalyst, and thereafter an uncoated or catalyst-coated DPF (EP 341,832). The $NO_2$ created in the oxidation catalyst oxidizes soot at reasonably low temperatures (>250-300° C.), when the oxidation catalyst is sufficiently efficient. The problems in the passive method are connected to situations where the creation of $NO_2$ is not sufficient, for example in congested urban driving, and the method requires a fuel with a very low sulfur content (S<10 ppm) for minimizing the creation of sulfate in the efficient and expensive Pt-bearing oxidation catalyst. The blocking of a DPF cannot be accepted in any situation, because this will interrupt the driving. Consequently, most current systems include active regeneration, which principle has already been applied for several decades. In 1979. Virk and Alperstain introduced a system provided with an oxidation catalyst and a DPF, in which system active regeneration is achieved by fuel supply. The use of modern adjusting technique together with motor control enables a reasonably accurate, active regeneration by means of a DPF.

DPF coating has already been used for over 25 years, and in the DPF, there have been added for example soot combustion or oxidation catalysts (Ernest 1980 and Enga 1981). With Pt-containing DPF:s, there are achieved systems where soot combustion temperature is lowered near to 300° C. (EP 0,160,482 and U.S. Pat. No. 4,510,265).

Usually the catalyst is added to a DPF by normal slurries used in catalyst coating (colloidal suspensions) or from aqueous solutions, and the most common coatings have been alumina-, zirconia- or silica-based (www.dieselnet.com/, Catalyzed diesel filters, 15.3.2006). Into the suspension, there are added catalyst raw materials from powders in particles with a regular size of roughly 1-40 μm. Pt/ceria-zirconia type coatings are also developed for DPF (Grimston 2002). Adsorption with aqueous solutions has several drawbacks, such as a low quantity of catalyst during each addition, and the difficulty to create coatings for a large surface area. With coatings used in cellular catalysts, the coating is normally obtained only on the channel walls, but less in the pores. The quantity of slurry coating must be kept low, in order to avoid raising the counterpressure excessively. If only the channel walls at the inlet end are coated, the catalyst approaches soot, but the total quantity of catalyst remains low. By coating with slurries, there also is obtained catalyst separately on both sides of the DPF. It has been suggested that the particle sizes in the slurries must be as small as possible, in order to make the stabilizing agent particles enter the pore surface. The size of DPF pores is within the range 10-20 μm. However, this kind of pore size filters nearly all of the slurry particles onto the channel walls, because in practice the minimum particle size in slurries is normally roughly 1 μm. The degree of filtering is high even for stabilizing agent particles of 100-500 nm, in similar fashion as for PM particles in practical usage conditions in a gas phase.

Most catalyst reactions in exhaust gas targets are kinetically restricted, and the use of a high Pt charge results in a very high Pt density, if the stabilizing agent quantity is low, in which case the expensive precious metal cannot be utilized properly. It has been suggested that catalytically active components can be added directly in the cordierite, but catalytic activity (NO/HC/CO oxidation) cannot be on the same level as the on the surface of a stabilizing agent with a large surface area. With respect to activity, the ceramic surface as such is not a good adhesion substrate for precious metals. The surface area of normal alumina-based stabilizers is over 200 m$^2$/g, whereas the material surface area of thermally burnt DPF material is below 5 m$^2$/g, typically even clearly below 1 m$^2$/g. It has also been suggested that on the surface of SiC, there is made a preliminary layer, to which the coating is attached (NoTox Corporation 1997). It has been suggested that larger pores are used in a DPF to be catalyst coated, so that it can be coated by the catalyst.

Irrespective of the regeneration of carbon, unburnt ashes are accumulated in the DPF, and the quantity of said ashes must be taken into account as regards measures, lubricant recommendations and possible maintenance operations.

OBJECT OF THE INVENTION

The object of the present invention is to achieve a catalytic coating for a particulate filter operating in diesel gas or corresponding waste gas, which coating enhances the catalytic reduction of emission components contained in the refuse gases in the targets of operation, i.e. the regeneration of the particulate filter, so that the pressure loss over the DPF does not rise too high or that the filtering efficiency for the particles, in comparison with an uncoated filter, is not weakened in the practical usage conditions.

For achieving this aim, the invention is characterized by what is specified in the independent claims. Other claims describe preferred embodiments of the invention.

In comparison with normal catalyst coated DPF:s, based on the prior art technology, by applying the novel type of catalyst and coating method there was achieved a lower pressure loss per quantity of coating, in which case the filter can be better utilized in catalytic reactions with active metals (generally precious metals). It is well known that catalytic activity in a catalyst reactor can be increased by increasing the quantity of the active component or coating. The use of catalyst coating enhanced the oxidation of carbon monoxide, hydrocarbons, nitrogen monoxide (NO) and particles. The oxidation of particles can be enhanced directly or by intermediation of $NO_2$.

DESCRIPTION OF THE INVENTION

The invention is based on the fact that a catalyst coated filter was manufactured by coating the filter wall pores with thin coating that does not essentially change the pore size distribution of the original filter nor the pressure loss in the circulation. This kind of coating was achieved by using in the manufacturing step a coating medium in sol form, which coating medium contains a mixture including two or more sols or components that are added in the filter simultaneously or separately. The size distribution of the particles contained in the sol is selected to be sufficiently small with respect to the filter pore size, and the other conditions, such as content and pH, are selected to be suitable for realizing a product according to the invention. In the manufacturing step, the sol can also be made into a gel prior to drying and calcination, or during them. Gelling is achieved thermally and/or chemically by using sol gelling solutions, gases or another sol.

Gelling can be enhanced by conducting, in a suction step or another drying step, into the filter gas containing for example acid fume (nitric acid, acetic acid) or other suitable gases (ammonia) containing small quantities of cations and anions. Gases can be used for preventing the dissolution of the sol, which is a risk when using solutions in the gelling process.

Possible fields of usage of the invention are exhaust gas, fume gas and refuse gas applications in mobile or stationary targets. Generally the gas mixture contains an excess of oxygen, either continuously or in average. In the combustion process, there can be used any kind of gaseous fuel (for example methane, propane, biofuels), liquid fuel (light or heavy fuel oil, diesel, gasoline or biofuels) or solid fuel.

The coating according to the invention can be coated, among others, for ceramic or metal particulate filters. The filters can be filters based on skin filtration, deep filtration or partial filtration. The filters can be circular, angular or oval-shaped, or represent a combination of these. The filters can be installed several in series in one and the same channel system, or in different channels, or they can be arranged by two or several in succession, in which case there is first installed a filter based on partial or deep filtration to remove part of the particles, and thereafter a filter based on skin filtering, which filter removes the rest of the particles. The filter materials can be cordierite, silicon carbide, silicon nitride, aluminum titanate, sintered metal, metal foam, ceramic foam, net wire, pellets, grains, paper, cloth or filtering metal structures.

The term 'sol' refers to a colloidal solution or colloidal dispersion containing large molecules or small particles, the size of which is roughly within the range of 2-200 nm, or which contain $10^3$-$10^9$ atoms (Livage 1982). With particles so small, surface features are extremely significant, and electronic charges around the particle affect the stability of the sol. The sols loose their stability, as the particles begin to precipitate. Among factors affecting the stability are cations and pH as well as the medium itself, from which complexes are solvated onto the particle surface. Ions often weaken the charge of the sol, and precipitation occurs more easily. Generally colloids are mixed in water, but also other liquid media are used, for instance organic solvents. In the sol, there can also be added surface active colloids that protect the particles, which colloids often are organic. Most particles are present in the sol as oxides or hydroxides. Colloidal oxides have a large surface area, for which reason they are interesting in catalysts. Sols can include one or several mixtures. A sol mixture can be made by mixing together two separate sols or sol mixtures. A sol can also be made from a solution by forming small particles in the sol.

A gel is obtained by reducing the medium quantity in the sol, in which case the particles form a 3-dimensional matrix, still containing some medium as encapsulated inside the structure (Livage 1982). From a dispersed sol, there can be obtained a very homogeneous gel that is held together by the liquid contained therein. From aggregated sol particles, there is obtained a structure containing larger pores. When drying, a sol can form, instead of a sol, a precipitate, a flocculant, where the solid material does not contain liquid.

Figure 2:
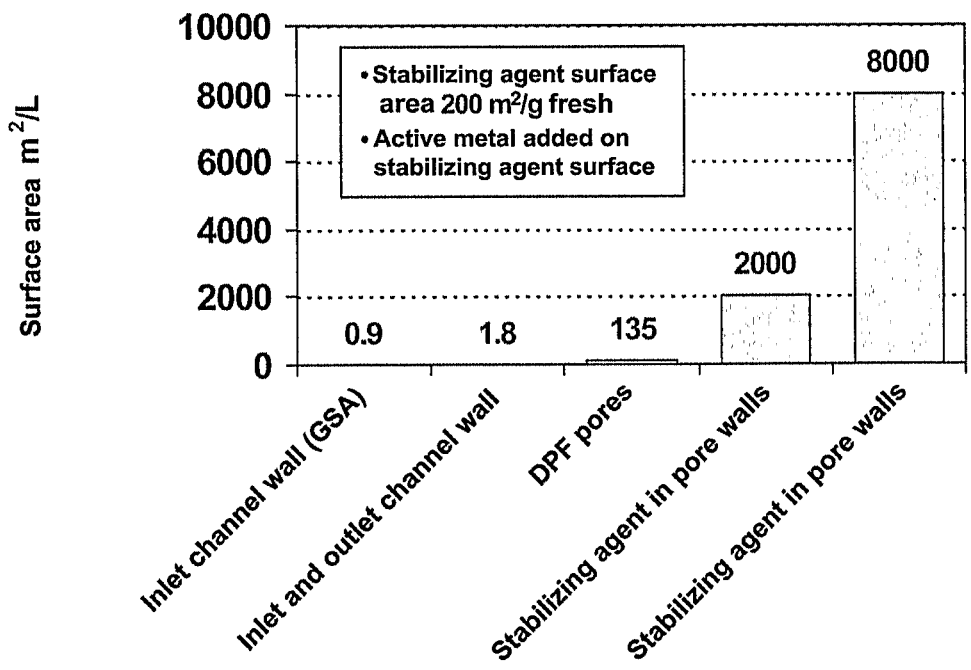

In certain conditions, gelling is likewise easily obtained by means of sols, but in this target of usage, the attempt was to avoid it in the beginning of the manufacturing process. Gelling takes place in a controlled and natural fashion by adjusting the sol conditions (temperature, dry matter content, pH, influence of other ions). By means of the coating, there is obtained added value to the DPF that has an ample amount of volume (generally more than 2× the motor volume), which volume could be used for catalytic purposes. By the coating according to the invention, the storage capacity of PM or ashes is not remarkably reduced, nor the pressure loss increased. In comparison with a normal stabilizing agent coating (stabilizing agent slurry containing large particles), the pressure loss is kept clearly lower with a sol coating, with the same quantity of coating (example 1). By means of sol coating, the pores are kept open, as the Hg porosimeter analysis shows (FIG. 2).

The parameters of a sol manufacturing process were optimized on the basis of the sol features (particle sizes, pH, stabilizing). The same concepts can also be made with separate sols or sol mixtures in successive steps, providing that it enhances production or operation (such as Si, Ti and Al sol combinations).

In the sols, there can also be added certain solutions or salts that did not cause gelling. A general problem in the addition of salts is the risk of gelling prior to the coating, wherefore the primary manufacturing method is to use pure sols or their mixtures. A certain amount of gelling may always occur, and regular particle size analyses for larger powders are not applicable in the manufacturing of small-particle sols.

The number of coating cycles is 1-3, in which case the process is both technically and economically advantageous. It was found out that in the manufacturing of sols, an advantageous dry matter content in the sol is 0.1-30% by weight, preferably 0.5-10% by weight. Within this range, the channels are not blocked, the sol is not gelled and there will not be too many soling cycles. The coating of DPF pores requires a special technique, different from that applied in the dip coating of catalysts, because the walls are thick (200-800 μm), and the wetting and emptying of the pores requires fairly strong suction forces.

According to an embodiment of the invention, DPF pores are kept open more effectively by suction than by a blasting treatment. A DPF coated by sol was advantageously suction-dried so dry that the sol began to be gelled. An effective suction also is important in order to get the walls evenly coated both in the axial and radial directions.

It was found out that the sol viscosity was an important variable, and it must be very low in comparison with slurry viscosities in slurry coatings.

According to an embodiment of the invention, the sol viscosity is within the range 1-20 cP, preferably 5-10 cP, in order to be able to coat DPF structures so that the pores are open, but there is left the required quantity of coating for the DPF:s.

Remarkably large quantities of coating can be added to filters with large pores. Typically the coating quantity in filters is within the range 5-120 g/l, preferably within the range 15-60 g/L. The quantity of a catalytically active mixture (such as precious metal) in cellular filters may vary within the range 0.5-400 g/cft (0.02-14.1 g/liter of filter) (cft=cubic feet) according to the target of usage, but typically it is within the range 5-100 g/cft. The quantity of a catalytically active mixture in the final coating may vary within the range 0.01-50% by weight, preferably within the range 0.1-5% by weight, which unit is better suited as a reference value in other than cellular filters.

The sols and sol mixtures described in the examples were selected so that there was obtained an optimal result with respect to coating capacity (viscosity), adhesion, activity, hydrothermal resistance, chemical resistance (sulfur resistance) and sol stability. The oxide quantities were typically within the range 0.5-10% by weight in sols that were not gelled. When sols are used in the production of slurries, the purpose is partly to gel larger raw material particles together.

According to an embodiment of the invention, the sol contains aluminum, titanium, cerium, zirconium and/or manganese oxides.

According to an embodiment of the invention, the coating contains an aluminum-titanium sol. It was found out that an advantageous mixture ratio was roughly $Al_2O_3:TiO_2=3:1-10:1$. such as 5:1-8:1. As regards the ratio $Al_2O_3:SiO_2$, the optimal result with respect to avoiding adhesion and gelling and with respect to resistance was obtained with a ratio within the range 1:1-4:1. In the sol mixture used in the experiments, the ratio $CeO_2:ZrO_2$ was 1.8:1, but according to a different target of usage, the ratio can be varied within the range of roughly 100:1-1:100, preferably within the range 20:1-1:1. Generally the ratio $CeO_2:Tio_2$ was rich in Ce, within the range 10:1-2:1. Generally the ratio $CeO_2:MnO_2$ is 10:1-1:1. preferably within the range 4:1-2:1. Other corresponding sols can also be added with the same technique in the sol mixture and the coatings. Mixtures that are difficult to control were added from separate sols in successive treatments. Advantageously a mixture containing an Al or Ce sol was added first in the filter.

By using a sol, there can also be made a coating that contains vanadium, tungsten, titanium, silicon and zirconium, or some of these, usually in oxide form. A sol may also contain zeolites (ZSM-5, Beta, Ferrierite, mordenite, Y, TS-1) used in the production of zeolites, which zeolites are coated, dried and finished (for example by calcination) to the particulate filter. In the zeolite, there can be added for instance known HC or $NH_3$—SCR active components and/or components used in oxidation catalysts. Preferably the $Si/Al_2$ ratio in the zeolite is within the range 10-1000. Zeolites can also be present in the coating together with other compounds according to the invention.

Active components (Pt, Pd, Rh, Ir, Ag, Ru, non-precious metal oxides) can be added in DPF:s coated with sol/sol gel technique by adsorption (dry, wet or chemisorption), as mixed in a sol or in sol form. The pores of the catalyst coating are attempted to be filled by dry and wet adsorptions while the content is on a level where exactly the correct quantity of active component remains in the pores after drying. By means of chemisorption technique (EP 0643624), Pt can be precisely and accurately added in the particulate filter in. The active components can be pre-matched with the sol particles prior to coating, by using a suitable pH and raw materials. The active components can also be added in the sol as sols or solutions by using water, organic solvents or their mixtures in a liquid phase. By using organic solvents (ethanol, glycol, propanol, acetic acid or the like), the hydrothermal changes of the active components can be protected during gelling, drying and finishing.

According to an embodiment of the invention, the quantity of active component in the coating is within the range 0.01-50% by weight, preferably within the range 0.1-5% by weight. An advantageous content depends on the active component as well as for instance on the treatment method and target of usage.

By using Pd, Rh or Ir in a filter coated by the sol technique, the formation of $NO_2$ can be reduced, and for example $deNO_x$ features (Rh, Ir) can be added, when the gas mixture concentrations are used up to an enriched mixture. A reduction in the creation of $NO_2$ is the aim in targets where the regeneration is carried out fully actively, for example by means of fuel injection and motor throttling, and if there is a need to minimize $NO_2$ emissions. Pd can be used, when the purpose of catalyzed DPF is purely to enhance catalytic combustion, and the temperatures are high in usage or regeneration conditions.

A filter coated with a catalyst according to the invention can in the manufacturing step be treated in static or dynamic conditions by typical oxidizing and/or reducing gas mixtures used in the treatment of catalysts, which gas mixtures may contain air, oxygen, hydrogen, carbon monoxide, ammonia, exhaust gas, hydrocarbons, water or inert gas. By means of said treatments, it also is possible to form various mixed oxides between said compounds by using suitable raw materials, particle sizes and finishing conditions.

In a coated filter, there can be added SCR-active compounds such as vanadium, iron, copper, manganese, cobalt or tungsten by means of adsorption, as a sol or mixed in a sol. In that case the filter can also be used as an SCR catalyst, when prior to the catalyzed filter, there is supplied ammonia, or compounds that form ammonia when they are decomposed. A coated filter can also form part of a system provided with one or several oxidation catalysts, filters according to the invention and $DeNO_x$ catalysts (SCR, $NO_x$ adsorbers, HC—SCR catalysts, $NO_x$ decomposition catalysts). A coated filter according to the invention can also be used together with an uncoated filter or a filter manufactured in some other way. In the coating, there can be added, for example by adsorption, typical $NO_x$ adsorption compounds, in which case nitrogen oxides can be adsorbed in a lean mixture and reduced during a rich mixture.

A filter according to the invention can be used in completely lean conditions (excessive oxygen) or in conditions where from time to time there is carried out a short-time adjustment of the mixture ratio approaching a stoichiometric mixture or even as far as a rich mixture. The adjusting of the mixture ratio and the resulting rise in temperature are carried out in order to regenerate the catalyzed filter either completely or partially from particles and accumulated toxic matter.

A coating according to the invention can be coated either in the whole filter or in a part thereof, for adjusting for instance the flow distribution or the filtering features. The coating can be added for example only halfway up with respect to the inflowing direction of the cell circulation. A coating according to the invention can also form part of a coating, in which case in the DPF, there is used a very small quantity of coating containing larger particles. The particulate filter can be first coated by a sol containing larger particles (50-100 nm) and thereafter by a sol containing smaller particles (<50 nm). By this method of coating, there is obtained a direct contact with the filter material, and the pores are completely open. A particulate filter can also be coated by using another strategy, i.e. by first coating with a sol containing small particles, and thereafter with a sol according to the invention containing larger particles (50-100 nm) or with a small quantity of a sol or slurry containing even larger particles (>100 nm) through the whole filter or in part of it. In this way, the filter is first coated throughout with small particles, whereafter on the channel walls there is brought such a tiny quantity (for example 1-10 g/l) of larger particles, that they do not yet increase the pressure loss.

By means of sol coating, it also is possible to adjust the filtering features of the particulate filter according to the target of usage. After manufacturing, the DPF has certain qualities, and it is not very simple to change the pore size distribution or corresponding variables during the manufacturing process. By sol coating, the filtering and counterpressure features can be customized to fall within the correct area. The filtering efficiency can be improved in challenging conditions by narrowing the pore sizes. The quantity of sol coating can be defined on the basis of the pore size distribution of an uncoated filter and perform the coating accordingly, for example a coating of 0.01-10 µm can be coated by a coating according to the invention in order to achieve the final pore size.

Embodiments according to the invention are described in the following examples 1-6.

In the performed tests, there were used sols or their mixtures, and the particle size, pH or contents in said sols were changed. The sols and sol mixtures used in the examples are enlisted in Table 1.

TABLE 1

Pressure loss measurements in particulate filters coated with sol mixtures and stabilizing agents.

| Coating | Composition % in sol/slurry | Coating g/L | Particle sizes in mixture | Pressure loss mbar (rise) | DPF*cpsi/µm |
|---|---|---|---|---|---|
| Sol 1 | 7% Al + 1% Ti | 41 | 25-60 nm | 36.3 → 38.8 (+7%) | 200/23 |
| Sol 2 | 3.5% Zr + 6.5% Ce | 40 | 8 nm | 36.1 → 39.5 (+9%) | 200/23 |
| Sol 3 | 7% Al + 1% Ti→ 3.5% Zr + 6.5% Ce | 38 | 8-60 nm | 37.3 → 39.5 (+6%) | 200/23 |
| Sol 4 | 10% Al + 5% Si→5% Ti + 1.7 Zr + 3.2% Ce | 42 | 20-80 nm → 8-60 nm | 18.3 → 20.5 (+12%) | 200/23 |
| Sol 5 | 10% Al → 5% Ti + 1.7% Zr + 3.2% Ce | 41 | 80-90 nm → 8-60 nm | 16.9 → 20.6 (+22%) | 200/23 |
| Sol 6 | 10% Al → 5% Ti + 1.7% Zr + 3.2% Ce | 44 | 20-30 nm → 8-60 nm | 17.1 → 19.0 (+11%) | 200/23 |
| Sol 7 | 7% Al + 1% Ti | 21 | 25-60 nm | 19.1 → 20.5 (+7%) | 300/24 |
| Sol 8 | 7% Al + 1% Ti | 40 | 25-60 nm | 37.8 → 30.3 (−20%) | 90/37 |
| Slurry 1 | 10% DOC | 44 | 25 nm-30 µm | 18.4 → 51.1 (+177%) | 200/12 |
| Slurry 2 | 4% ZrCe(p) + 0.5% Ti + 3.1% + 5.8% Ce | 21 | 8 nm-30 µm | 37.3 → 51.4 (+38%) | 200/23 |
| Solution 1 | 4% Al-nitr | 42 | Al-nitrate solution | 16.6 → 31.5 (+90%) | 200/23 |

Al: $Al_2O_3$ sol particles; Ti: $TiO_2$ sol particles; Zr: Zr sol particles; Ce: $CeO_2$ sol particles; DOC: A typical diesel oxidation catalyst slurry containing coarse alumina, ZrCe(p) and zeolite particles (1-30 µm); ZrCe(p): ZrCe oxide powder.
DPF*characters per square inch (cpsi) and average pore size in the wall on the basis of an Hg porosimeter analysis.

EXAMPLE 1

Full-size DPF:s (silicon carbide, 90-300 cpsi, D144, L147-180) were coated by using different sol mixtures or stabilizing agent slurries. In the coating situation, the sizes of the particles contained in the sol mixtures were below 100 nm. The stabilizing agent contained raw material particles (zeolite, metal oxide, alumina), the particle size of which was clearly over 1 μm in average, and even after grinding, there were still a lot of particles having an average diameter of over 10 μm. The samples according to the invention were coated by sol mixtures throughout the whole cell by utilizing an effective suction during the formation, stabilizing and drying of the sol layer. After coating, the samples were calcinated in air by raising the temperature from 25-200° C. on the ramp up to 550° C. and by further cooling them back to lower temperatures. Reference samples were treated in the same way. The success of the coating was evaluated in a counterpressure measurement by air at room temperature with the flow quantity of 6 $m^3$/min (Table 1). The term 'sol' is here used of sols containing only sols or their mixtures and slurries, and the term 'slurry' is used when there also are contained solid particles added from pulverous raw materials. Moreover, in one experiment, the DPF was coated by an Al nitrate solution.

The quality of the coating was evaluated on the basis of the rise in the pressure loss. The lower the rise with the same quantity of coating, the better the result. With sol coatings, the pressure loss was kept below 25%, but with coatings containing slurries, the pressure loss rose by 38% and 177%. When coating with an Al nitrate solution, it also was difficult to keep the pressure loss low, when the quantity of added coating was roughly 40 g/L. With a large-channel DPF, the achieved reduction in pressure loss was even 20%, which proves that the sol had cleaned or evened out the pore channels in the wall. Thus it is possible to even lower the pressure loss by a sol treatment, which is a remarkable advantage with coating treatment. After the manufacturing process of SiC cells, the DPF cell can contain small particles that are removed by the sol treatment. The sol treatment can also replace extra washing steps (such as washing with water) in the cell processing, which saves a lot of energy and time.

Sols were added by using one sol mixture or by using two different sol mixtures in successive treatments. The employed Al sols consisted of two different sols, where the particle sizes were roughly 25 nm or nearly 90 nm. With a rougher Al sol, the pressure loss was kept low, when it was first used for treating the uncoated DPF, whereafter the same DPF was coated by a mixture of Ti and ZrCe sols. In the sol mixtures, by using a 25 nm Al sol, the rise in pressure loss remained low. A mixture of Al, Ti Zr and Ce oxides was obtained by mixtures of sols with small particles (>100 nm) (Sols 3, 5 and 6). Along with the process, there could also be Si (sol 4) that was added together with the Al sol. These sols also exist with very large particles, up to 800 nm, which means that in the coating of a DPF, there were used carefully selected sol mixtures with small particles. The mixture ratios were selected so that there was achieved a good adhesion on the surface of SiC (DPF), the thermal resistance was good and the sols remained non-gelled during the coating process, but at the same time the number of coating cycles remains as small as possible. With these sol mixtures, there was obtained roughly 20-25 g/L coating during one coating cycle. In some cases it is, however, advantageous to add an extremely small amount of coating during one coating cycle. The pH values of the sol mixtures were within the range 1-5, in which case the sols remained non-gelled in the sol mixtures of the examples. A sol of a very different type, stabilized within a different range, had to be added as a separate sol or a sol mixture, in order to prevent gelling during the making of the sol. Also a clearly alkaline sol, or mixtures of alkaline sols, can be used in the coating. When selecting mixture compositions, the viscosity was adjusted to be within the range of roughly 5-20 cP. It was often not possible to make multicomponent mixtures according to all criteria by mixing all sols in one mixture, but in those cases the treatments were carried out by successive sol mixtures. Consequently, in the selection of the sol, it was necessary to use certain threshold values, by which the best coatings, results and sol stabilities were achieved.

The effect of a sol in the DPF pore size distribution was evaluated on the basis of an Hg porosimeter analysis. By means of the coating, there was achieved a coating that did not remarkably change the original properties of the filter; FIG. 1. The influence of the sol coating in the DPF pore size distribution is slight (sol 1. 40 g/L).

By means of sol coating, on the DPF pore walls there can be added particles with a large surface area, preferably for example oxides $Al_2O_3$, $TiO_2$, $SiO_2$, $CeO_2$, $ZrO_2$; FIG. 2. The increasing of the total surface area for catalytic purposes is achieved by coating the particulate filter (200 cpsi) with sol/mixtures (7% Al-1% Ti). The surface areas are based on the DPF dimensions (walls) and measurements (DPF pores by the Hg porosimeter and by the stabilizing agent BET measurement).

The SiC surface area itself is very low (<1 $m^2$/g), being restricted to the area of the pores, which is relatively low owing to the high temperature treatment of the DPF in the production process, and the SiC does not remarkably contain meso- or microporosity, but the major part of the surface area is obtained from the surface of SiC grains. By using corresponding solutions, it would be difficult to obtain a large specific surface area, because precursor salts generally loose surface area in a hydrothermal treatment during drying and calcination. In catalyst reactions, particularly with gaseous reactants, it is perfectly possible to make use of the macro-, meso- and even micropores of porous materials. A large surface area is needed in order to be able to distribute the expensive, active metal or metal oxide evenly in this created stabilizing agent. For example, when the Pt charge rises up to the level 10-200 g/cft (0.3-7.0 g/liters cell), the Pt content when calculated per stabilizing agent is easily within the range 1-10% by weight, in which case it is known that there is needed a large area in order to make the Pt dispersed into particles with the size of a few tens of nanometers. Generally an extremely low (Åström-level) Pt particle size is not sought in DPF targets, but there is sought a moderate particle size, because a slightly larger particle size is advantageous for the creation of $NO_2$, and in any case the catalyzed DPF is subjected to thermal strain, in which case a very high dispersion cannot be maintained in practical usage conditions. A precious metal as dispersed in a moderate dispersion in a stabilizing agent with a large surface area also is thermally much more resistant than a precious metal as less dispersed in a stabilizing agent with a low surface area. By using sol and sol gene technique, the precious metal could be added in an optimal stabilizing agent that is known to endure in the practical usage conditions. If the Pt dispersion in the stabilizing agent is too poor, or if the Pt is placed directly on the DPF surface, the thermal resistance is poor. The stabilizing agents used in the invention stabilize the Pt located on the DPF surface, so that said interaction between Pt and stabilizing agent reasonably endures thermal aging treatments. In comparison with the surface of the SiC pores (135 $m^2$/L cell), in which the active metal can be dispersed, the surface area rises up to nearly 60-fold with a thin 40 g/L coating (200 $m^2$/g).

With some sols, the sol mixture could be made without gelling, but with a few compositions, it was necessary to perform successive sol treatments with different sols.

The catalytic action with the samples manufactured by the sol technique was evaluated, with respect to the CO/HC/NO/C oxidation both fresh and aged within the range 700-900° C. By using selected single sols or sol mixtures, there was achieved an even coating in the DPF pores. SiC-DPF:s with a low surface area that were treated at high temperatures need a separate coating in order to create conditions for catalytic activity. Various different coatings according to the invention were included in the tests.

According to an embodiment of the invention, in the manufacturing of a particulate filter coating, there is used a liquid-based sol or sol mixture, and the average particle sizes in the used mixtures are below 100 nm at the initial situation of the process, in a coating situation or as raw material. Advantageously an average particle size based on content is below 50 nm. By using sols with small-size particles, also DPF wall pores can be evenly coated. In comparison with solutions, in sols the material in question is dispersed as very small particles, generally in a water-based sol, where also stabilizers may be included. Because each sol is specifically stabilized as an individual product, an accidental mixing of sols may easily result in gelling already before coating. Different sols are stabilized for instance with respect to pH and stabilizers for different conditions. The best practical results were obtained when in the coating process there was used a mixture of two or more sols that were added in the filter simultaneously or in different steps.

It was found out that in sol coating, the best functioning and hydrothermally resistant options were different sol mixtures, where the employed oxides were mixtures of Al, Ti, Si, Ce and ZrCe sols. The separate particles present in the sol can be pure oxides or their mixed oxides or oxide mixtures. For example Ce can be present in the same particles together with Zr, Ti and Mn. The particles can also be in some other than oxide form (such as metallic, carbonate, nitrate or sulfate). The coating was evaluated on the basis of functional features, coatability and pressure loss. In laboratory and motor tests, the operation was evaluated, among others, on the basis of $NO_2$ formation (examples 2-6, FIGS. 3-5 and 8).

EXAMPLE 2

Figure 3:
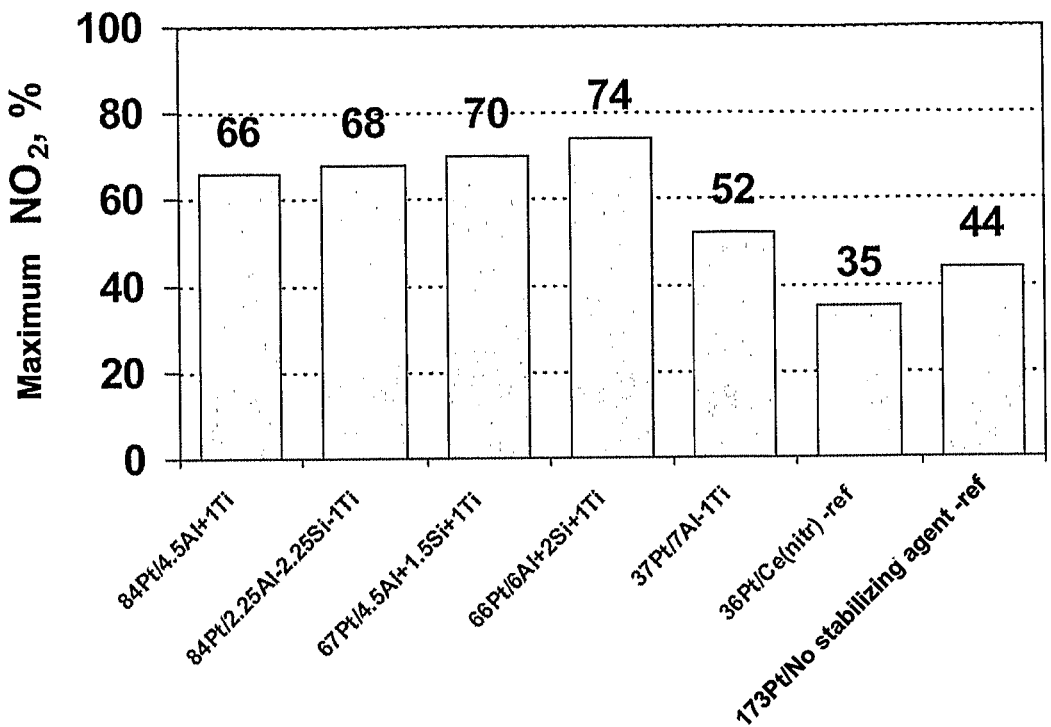

Small particulate filters (length 25 mm, diameter 14 mm) were coated in a laboratory for studying catalytic activity. The samples were coated by a sol, dried slowly by suction air and finally calcinated at 550° C. for 1 hour. Pt was added to these samples by a regular wet adsorption method from an aqueous solution. In wet adsorption, the solution contains just enough Pt, in order to obtain the correct quantity of Pt in the solution left in the cell. After Pt adsorption, the samples were again dried and calcinated at 550° C. for 1 hour. With Pt bearing (37-84 g/cft Pt) coatings according to the invention, there was achieved a clearly higher $NO_2$ formation than with a sample where a large quantity of platinum was wet adsorbed directly to a SiC cell (code 173Pt/no stabilizing agent-ref) or where the coating was made by Ce nitrate; FIG. 3. The maximum $NO_2$ formation in laboratory tests with fresh, coated 200 cpsi particulate filters according to the invention (Feed: 1000 ppm NO, 8% $H_2O$, 10% $O_2$, the rest nitrogen, exchange 40,000 $h^{-1}$). Coating thickness roughly 40 g/L.

EXAMPLE 3

Figure 4:
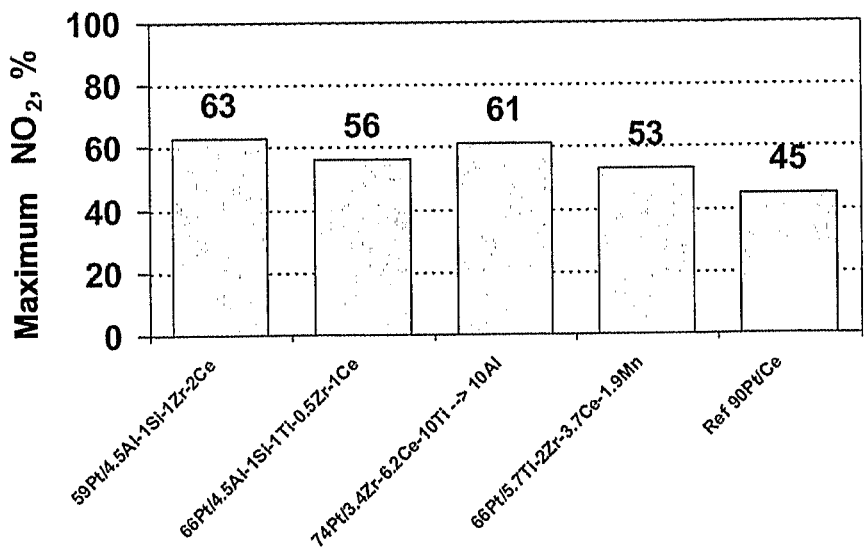

The samples of the example were manufactured in the same way as the samples of example 2. By coatings according to the invention, there was achieved a high $NO_2$ formation in laboratory tests, while the Pt charge was 59-74 g/cft; FIG. 4. Maximum $NO_2$ formation in laboratory tests with fresh, coated 200 cpsi particulate filters according to the invention (Feed: 1000 ppm NO, 8% $H_2O$, 10% $O_2$, exchange 40,000 $h^{-1}$). Coating thickness roughly 40 g/L.

The employed reference was commercial Pt and ceria bearing ceramic filter, the operation of which, on the basis of $NO_2$ maximum, was lower than with samples according to the invention. Coating 9.6ZrCe-10Ti→10Al was produced by using two different sol mixtures. In the sample 5.7Ti-5.7ZrCe-1.9Mn, Mn was added as nitrate in the sol mixture without the sol mixture being gelled. This proved that in certain sol mixtures, there can be added a small quantity of precursor in soluble form.

EXAMPLE 4

Figure 5:
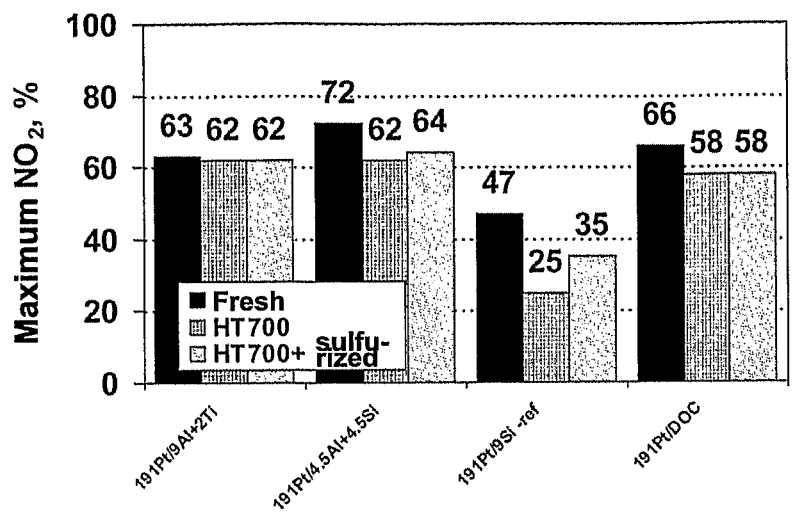

Samples according to the invention were manufactured in the way explained in example 2, and they endured well the hydrothermal and sulfurizing aging; FIG. 5: Maximum $NO_2$ formation in laboratory tests with fresh and aged fresh, coated 200 cpsi particulate filters according to the invention (Feed: 1000 ppm NO, 8% $H_2O$, 10% $O_2$, exchange 40,000 $h^{-1}$). HT700: hydrothermal aging 700° C. 20 hours. Sulfurizing: 400° C., 25 ppm $SO_2$, 10% $O_2$, 8% $H_2O$, 20 hours. Coating thickness roughly 40 g/L.

The silica coating used as a reference and made solely of Si sol did not endure the aging operations. $SiO_2$ was used as a Pt stabilizing agent with the purpose to realize a high $NO_2$ formation and a low sulfur binding. This test, however, showed that this kind of coating is not competitive in real-life conditions.

EXAMPLE 5

The operation of full-scale coated SiC particulate filters was evaluated in an Opel Astra 1.9 CDTi car in a standard test cycle (EDC=European Driving Cycle). With coated filters, the particle filtering features remained at least as good as with uncoated, and with a standard particle weighing method, the result fell easily under the Euro 5 emission standard (5 mg/km particles). The operation was evaluated on the basis of particle, CO, HC and $NO_2$ emissions. The car was provided with active regeneration, which means that the particle regeneration was not based on the oxidizing of carbon by $NO_2$. By means of $NO_2$, it is possible to reduce the density of active regenerations in suitable driving conditions and to lower the temperature required by active regeneration (generally 500-650° C.) in suitable driving conditions and with a suitable catalyst.

Figure 6:
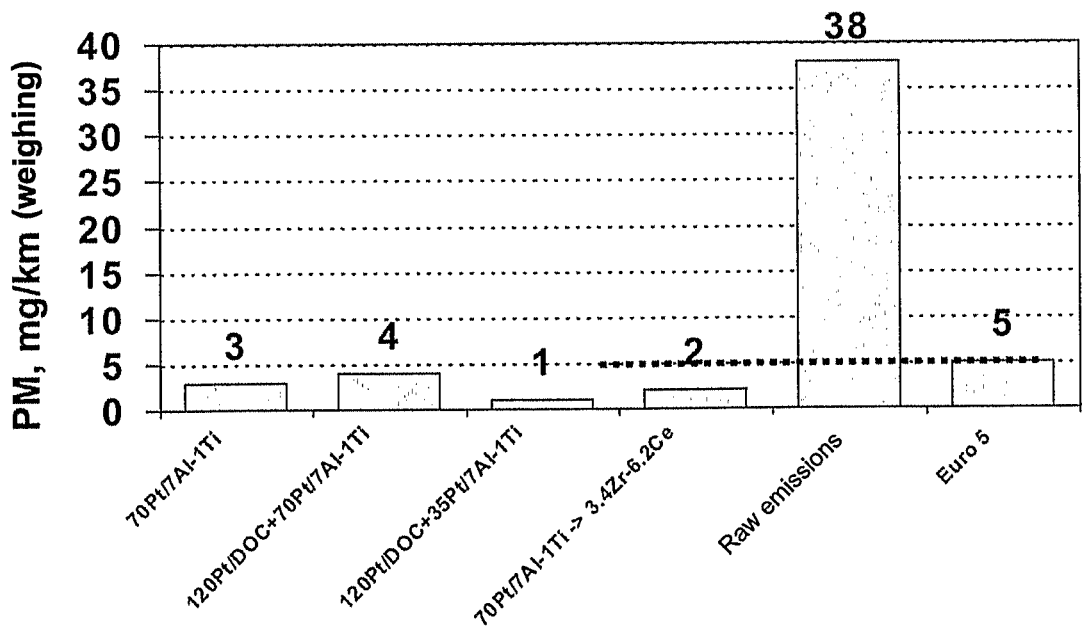
Figure 6:
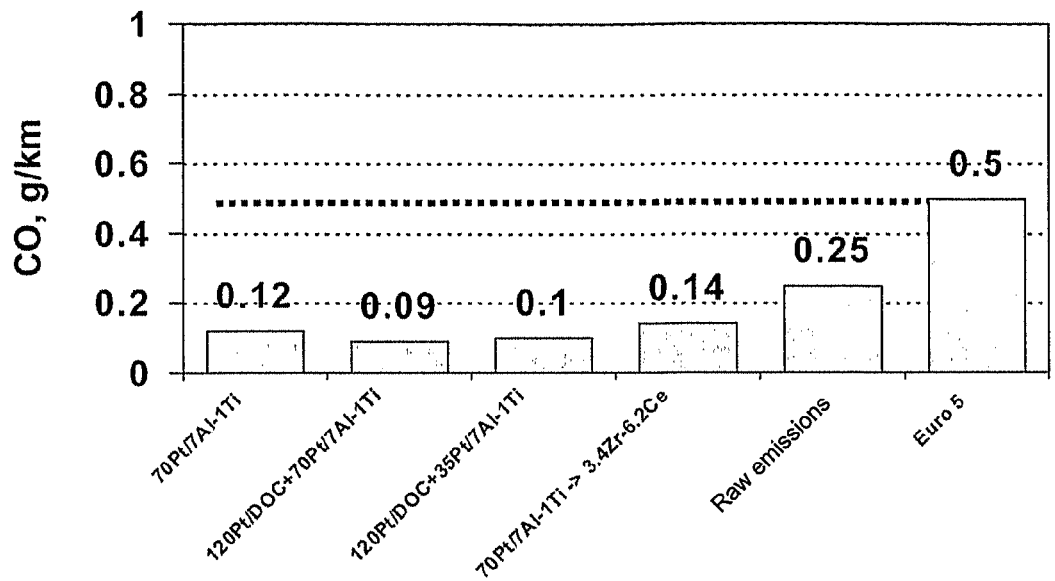
Figure 6:
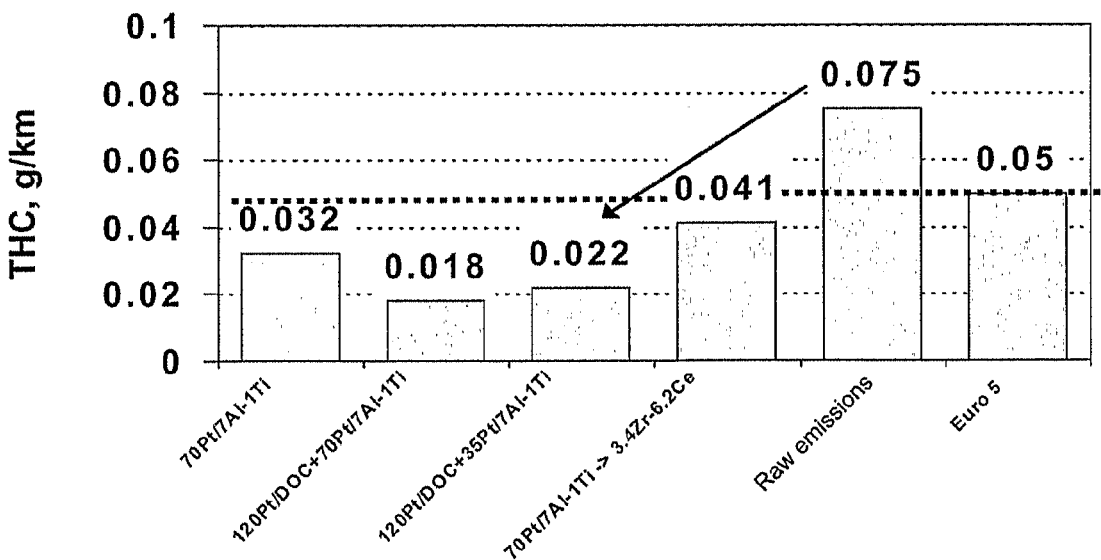

As regards PM, CO and HC emissions, with particulate filters coated by coatings according to the invention, there were achieved results that fell under the future Euro 5 standards; FIG. 6. Particle (PM), CO and hydrocarbon emissions (THC) in EDC, with Opel Astra CDTi 1.9 provided with catalyst coated particulate filters. DOC: diesel oxidation catalyst 350 cpsi, 0.65 liters, DOC stabilizing agent roughly 40 g/m². Pt charge (g/cft) in drawings in front of the Pt. Coating thickness roughly 40 g/L in filters (characters per square inch 200 cpsi, volume 2.5 liters).

Nitrogen oxide emissions did not remarkably change in the tests, and the Euro 5 standards were achieved by calibrating the motor raw emissions to below 0.08 g/km; by combining said calibration in a catalyzed DPF or a combination of oxidation catalyst and DPF according to the invention, the Euro 5 standards can be reached as regards all emissions. By using 70 g/cft Pt DPF in an Al—Ti coating according to the invention (Table 1 sol 1), the Euro 5 standards were achieved simply by using a catalyzed DPF, and the pressure loss was roughly the same as with an uncoated particulate filter. By using a small oxidation catalyst in front of the DPF, the oxidation activities could be further enhanced, and the Pt charge could be lowered to the DPF level 35 g/cft, in which case CO and HC emissions could be remarkably reduced. The temperatures in the EDC test were extremely low, which makes the oxidation reaction (FIG. 7) difficult.

A catalyzed DPF is useful during active regeneration, because the temperature in the oxidation catalyst located at the front is generally in diesel car targets attempted to be maintained reasonably low (500-600° C.) in order to start the regeneration. In that case part of the hydrocarbons in the supplied fuel peak (even thousands ppm or percentages) goes easily through the oxidation catalyst, and thus it is possible to oxidize the rest of the HC into water and carbon dioxide in a catalyzed DPF. In a DPF, the temperature easily rises 100-200° C. higher than in the oxidation catalyst, as a result of the combustion of soot and hydrocarbons, and the DPF size is typically 4-5 times as big as the size of the oxidation catalyst, in which case HC has sufficiently delay time and heat for the reaction, even if the precious metal charge in the DPF would be fairly low.

EXAMPLE 6

Figure 7:
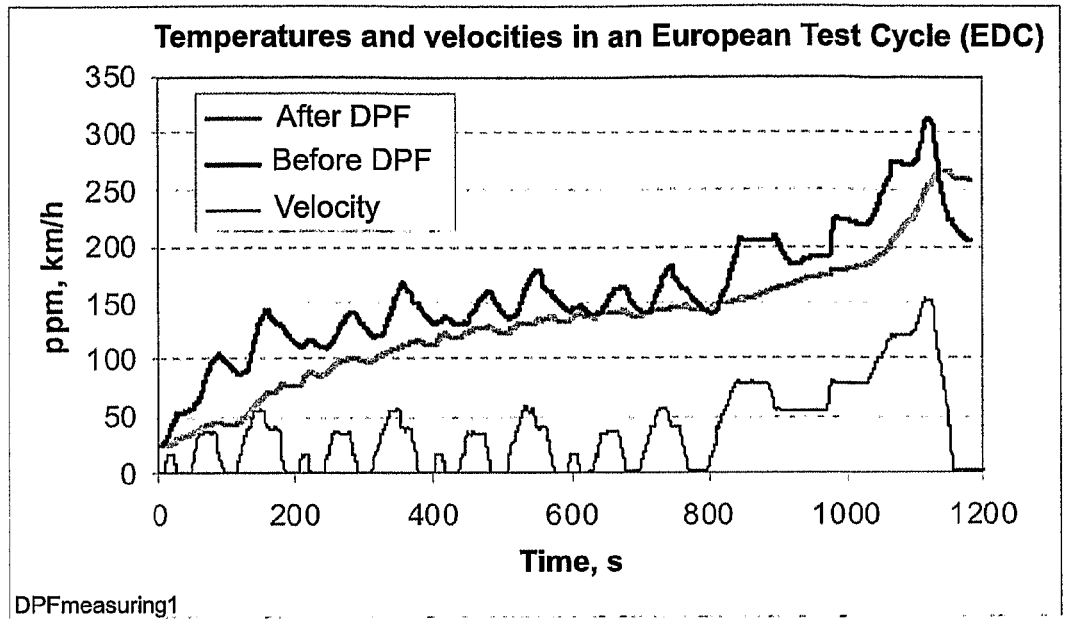
Figure 8:
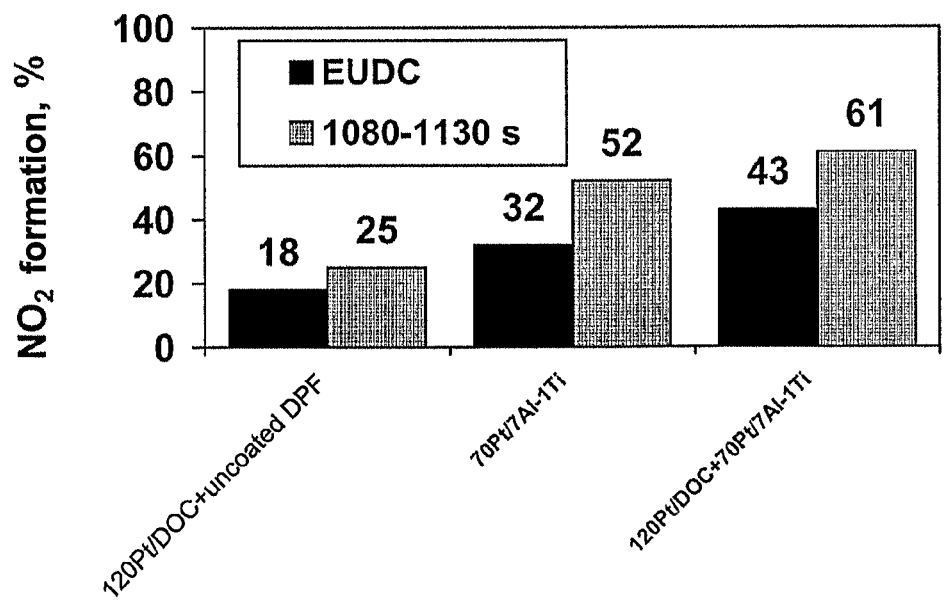

$NO_2$ was created in the vehicle even during EDC, although the temperature at its highest was only slightly over 300° C.; FIG. 7. Temperatures and driving speed in the European driving cycle. Because the temperature at the beginning of EDC is during 800 s too low for $NO_2$ formation, the $NO_2$ formation was evaluated during open-road driving (EUDC) or at certain maximum temperature spots (1080-1130 s, cf. FIG. 7). By using a catalyzed filter, the achieved $NO_2$ formation during EUDC was even 32%, which conversion was even higher than with an oxidation catalyst (the same as in example 5) and with an uncoated DPF, which is the regular system used in cars; FIG. 8. $NO_2$ formation during EUDC with a catalyzed DPF (70 g/cft Pt).

Consequently, by using these kind of catalyzed systems, $NO_2$ emissions are hardly created with passenger cars in urban driving, but only in open-road driving at the velocities of over 80-100 km/h. A maximum $NO_2$ formation during EUDC was obtained by the combination DOC+catalyzed DPF (43% $NO_2$ in EUDC and 61% within the time range 1080-1130 s). Catalytically the $NO_2$ created on the DPF surface has a better chance to a contact with soot than the $NO_2$ created in advance in an oxidation catalyst, especially when the catalytic combustion of carbon with $NO_2$ or oxygen should be utilized. $NO_2$ is a source of reactive, dissociated oxygen, and it is attempted to be utilized in the combustion of soot in a catalyst coating according to the invention. The coating according to the invention enhanced the combustion of soot by oxygen, in comparison with thermal combustion or a few other regular oxidation catalysts. Therefore the now developed coating gives a chance to extend the intervals between active regenerations, as the soot burns slowly by oxygen or $NO_2$ in certain driving conditions, for example in open-road driving, or during active regeneration, already at temperatures somewhat lower than in thermal combustion.

Although the now developed coatings enhance the $NO_2$ formation, it is not their primary purpose to regenerate DPF passively with $NO_2$, but actively by raising the temperature according to the adjustment strategy. A possible favorable influence of $NO_2$ is seen in that the regeneration interval can be extended, and hence the fuel consumption can be reduced. Catalysts made by the sol coating technique also have a catalytic effect in the burning of soot by oxygen or $NO_2$ (Pt catalysts). CDPF can be used for replacing a regular main catalyst that is needed in many targets, and in this way savings can be achieved in the overall system.

REFERENCES

Dettling, J. C. and Skomorowski, R., Catalyzed diesel exhaust particulate filter, EP 0,160,482, 1984. Engelhard!
Enga, B. E., Regenerating diesel emissions control devices, EP 0,070,619, 1981.
Ernest, M. V. and Welsh, W. A., Diesel exhaust catalyst, U.S. Pat. No. 4,303,552, 1980.
Fino, D., Dieselsoot catalytic combustion, PhD thesis, University of Technology in Torino, 2003.
Grimston, K. R. et al., Engelhard, Exhausty system for enhanced reduction of nitrogen oxides and particulates from diesel engines, US pat. 2002,044,897, 2002.
Hartwig, M. M., Platinum/silver vanadate catalyzed diesel exhaust U.S. Pat. No. 4,510,265, 1984. Engelhard.
Livarge, J. and Lemerle, J., Transition metal oxide gels and colloids, Ann. Rev. Materl. Sci. 12 (1982) 103.
NoTox Corporation, 1997. "NoTox Silicon Carbide Diesel Particulate Wall Flow Filters", Mini-manual of design considerations with the use of catalytic active coatings, September 1997.
Slotte, T., Method for impregnating catalyst support with platinum, EP 0643624.
Virk, K. and Alpeinstain, M., Rejuvenation of an exhaust gas particulate filter, GB 2,064,983, 1979.

The invention claimed is:

1. A particulate filter used in treatment of exhaust or waste gases, comprising:
   a coating comprising
   i) a first sol, where the average particle size of the particles contained in the first sol is 50-100 nm, the dry matter content is 0.1-30% by weight and the first sol contains at least one oxide mixture selected from the group consisting of:
   an $Al_2O_3$ aluminum oxide and $TiO_2$ titanium oxide mixture, where $Al_2O_3:TiO_2=3:1-10:1$,
   an $Al_2O_3$ aluminum oxide and $SiO_2$ silicon oxide mixture, where $Al_2O_3:SiO_2=1:1-4:1$,
   a $CeO_2$ cerium oxide and $ZrO_2$ zirconium oxide mixture, where $CeO_2:ZrO_2=100:1-1:100$,
   a $CeO_2$ cerium oxide and $TiO_2$ titanium oxide mixture, where $CeO_2:TiO_2=10:1-2:1$, and
   a $CeO_2$ cerium oxide and $MnO_2$ manganese oxide mixture, where $CeO_2:MnO_2=10:1-1:1$; and
   ii) a second sol, where the average particle size of the particles contained in the second sol is below 50 nm, the dry matter content in the second sol is within the range 0.1-30% by weight, and the second sol contains at least one oxide mixture selected from the group consisting of:
   an $Al_2O_3$ aluminum oxide and $TiO_2$ titanium oxide sol mixture, where $Al_2O_3:TiO_2=3:1-10:1$,
   an $Al_2O_3$ aluminum oxide and $SiO_2$ silicon oxide sol mixture, where $Al_2O_3:SiO_2=1:1-4:1$,
   a $CeO_2$ cerium oxide and $ZrO_2$ zirconium oxide sol mixture, where $CeO_2:ZrO_2=100:1-1:100$,
   a $CeO_2$ cerium oxide and $TiO_2$ titanium oxide sol mixture, where $CeO_2:TiO_2=10:1-2:1$, and a $CeO_2$ cerium oxide and $MnO_2$ manganese oxide sol mixture, where $CeO_2:MnO_2=10:1-1:1$; and wherein the coating further includes, as a catalytically active component, at least one of platinum, rhodium, iridium, palladium, ruthenium and silver, wherein the quantity of the catalytically active component in the coating is within the range 0.01-50% by weight, the sol viscosity is 1-20 cP, and wherein the coating includes two or three coats of first and second sols.

2. The particulate filter according to claim 1, wherein the second sol further contains an oxide of at least one of iron, cobalt, nickel, copper, vanadium, tungsten, boron, tin, gallium, indium, lanthanum, praseodymium and niobium.

3. The particulate filter according to claim 1, wherein the filter keeps a pressure loss below 25% when measured by a rise in the pressure loss as compared to an otherwise same uncoated particulate filter used in the treatment of exhaust or waste gases.

4. The particulate filter according to claim 1, wherein the each of first and second sols further contain at least one of water, organic solvent and a surface active sol stabilizing agent.

5. The particulate filter according to claim 1, wherein in the first and second sols, one or more components are added in solution form.

6. The particulate filter according to claim 1, wherein the particulate filter is suction dried.

7. A method for manufacturing a particulate filter used in the treatment of exhaust or waste gases, comprising the step of:

coating the particulate filter with a first sol, where the average particle size of the particles contained in the first sol is 50-100 nm, and with a second sol, where the average particle size of the particles contained in the second sol mixture is below 50 nm, wherein the dry matter content in the first and second sols is within the range 0.1-30% by weight, wherein each of the first and second sol contain at least one oxide mixture selected from the group consisting of:

an Al2O3 aluminum oxide and TiO2 titanium oxide mixture, where Al2O3:TiO 2=3:1-10:1, an Al2O3 aluminum oxide and SiO2 oxide mixture, where Al2O3:SiO2=1:1-4:1, a CeO2 cerium oxide and ZrO2 zirconium oxide mixture, where CeO2:ZrO2 =100:1-1:100, a CeO2 cerium oxide and TiO2 titanium oxide mixture, where CeO2:TiO2=10:1-2:1, and a CeO2 cerium oxide and MnO2 manganese oxide mixture, where CeO2:MnO2 =10:1-1:1, wherein the coating includes, as a catalytically active component, at least one of platinum, rhodium, iridium, palladium, ruthenium and silver, by adsorption or along with the sol mixture, wherein the quantity of the catalytically active component in the coating is within the range 0.01-50% by weight, wherein the sol viscosity is 1-20 cP, and wherein the coating includes two or three coats of the first and second sols.

8. The method according to claim 7, wherein the each of first and second sols further contain an oxide of at least one of iron, cobalt, nickel, copper, vanadium, tungsten, borium, tin, gallium, indium, lanthanum, praseodymium and niobium.

9. The method according to claim 7, wherein the particulate filter is suction dried.

10. The method according to claim 7, wherein in the first and second sols, at least one component is added in solution form.

11. The method according to claim 10, wherein the filter keeps pressure loss below 25% when measured by a rise in the pressure loss as compared to an otherwise same uncoated particulate filter used in the treatment of exhaust or waste gases.

12. A method of treating exhaust or waste gases, comprising the steps of:

providing a particulate filter comprising a) a coating comprising i) a first sol, where the average particle size of the particles contained in the first sol is 50-100 nm, and ii) a second sol, where the average particle size of the particles contained in the second sol is below 50 nm, wherein, the dry matter content in the first and second sol is within the range 0.1-30% by weight, and each of the first and the second sol contain at least one oxide mixture selected from the group consisting of:

an $Al_2O_3$ aluminum oxide and $TiO_2$ titanium oxide mixture, where $Al_2O_3:TiO_2=3:1-10:1$, an $Al_2O_3$ aluminum oxide and $SiO_2$ silicon oxide mixture, where $Al_2O_3:SiO_2=1:1-4:1$, a $CeO_2$ cerium oxide and $ZrO_2$ zirconium oxide mixture, where $CeO_2:ZrO_2=100:1-1:100$, a $CeO_2$ cerium oxide and $TiO_2$ titanium oxide mixture, where $CeO_2:TiO_2=10:1-2:1$, and a $CeO_2$ cerium oxide and $MnO_2$ manganese oxide mixture, where $CeO_2:MnO_2=10:1-1:1$, wherein the coating further includes, as a catalytically active component, at least one of platinum, rhodium, iridium, palladium, ruthenium and silver, wherein the quantity of the catalytically active component in the coating is within the range 0.01-50% by weight, wherein the sol viscosity is 1-20 cP, and wherein the coating includes two to three coats of first and second sols; and b) passing the exhaust or waste gases through said particulate filter.

* * * * *